(12) United States Patent
Reed et al.

(10) Patent No.: US 12,524,962 B2
(45) Date of Patent: *Jan. 13, 2026

(54) COMPUTER VISION SYSTEMS AND METHODS FOR END TO END IMAGE INSPECTION

(71) Applicant: Insurance Services Office, Inc., Jersey City, NJ (US)

(72) Inventors: Corey David Reed, Cedar Hills, UT (US); Ron Richardson, South Jordan, UT (US); Lyons Jorgensen, Orem, UT (US); Jacob Jenson, Cedar Hills, UT (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/209,542

(22) Filed: Mar. 23, 2021

(65) Prior Publication Data

US 2021/0209844 A1    Jul. 8, 2021

Related U.S. Application Data

(63) Continuation of application No. 16/564,586, filed on Sep. 9, 2019, now Pat. No. 10,957,101.

(60) Provisional application No. 62/728,337, filed on Sep. 7, 2018.

(51) Int. Cl.
*G06T 17/05* (2011.01)

(52) U.S. Cl.
CPC .......... *G06T 17/05* (2013.01); *G06T 2215/16* (2013.01); *G06T 2219/004* (2013.01)

(58) Field of Classification Search
CPC ................................ G06T 17/05; G06T 15/04
See application file for complete search history.

(56) References Cited

U.S. PATENT DOCUMENTS

| | | | |
|---|---|---|---|
| 8,339,394 B1 | 12/2012 | Lininger | |
| 10,073,612 B1* | 9/2018 | Hale | G06F 3/0488 |
| 10,957,101 B2 | 3/2021 | Reed et al. | |
| 2005/0280711 A1* | 12/2005 | Ishii | H04N 5/23219 |
| | | | 348/207.99 |
| 2008/0247636 A1 | 10/2008 | Davis et al. | |

(Continued)

OTHER PUBLICATIONS

International Search Report of the International Searching Authority mailed on Nov. 14, 2019, issued in connection with International Application No. PCT/US2019/050184 (3 pages).

(Continued)

*Primary Examiner* — Phi Hoang

(74) *Attorney, Agent, or Firm* — McCarter & English, LLP

(57) ABSTRACT

A system and method for generating models from digital images in an interactive environment comprising a memory and a processor in communication with the memory. The processor captures or derives metadata for one or more digital images. The processor derives transforms from the metadata to align the digital images with one or more three-dimensional ("3D") models of objects/structures represented in the digital image. The processor generates an interactive environment which allows a user to view a contextual model of each of the objects/structures in two dimensional ("2D") and 3D views.

10 Claims, 22 Drawing Sheets

(56) References Cited

U.S. PATENT DOCUMENTS

| | | | | |
|---|---|---|---|---|
| 2010/0208040 | A1* | 8/2010 | Guillou | H04N 13/183 348/51 |
| 2014/0340395 | A1* | 11/2014 | Mattila | H04N 13/275 345/420 |
| 2015/0193972 | A1* | 7/2015 | Algreatly | G06T 17/30 345/420 |
| 2016/0086375 | A1* | 3/2016 | Devaki | G06F 30/13 345/419 |
| 2017/0213383 | A1 | 7/2017 | Lawler et al. | |
| 2018/0033193 | A1* | 2/2018 | Goel | G06T 15/04 |
| 2018/0053329 | A1 | 2/2018 | Roberts et al. | |
| 2018/0239313 | A1 | 8/2018 | Santarone et al. | |
| 2019/0384405 | A1 | 12/2019 | Iyer et al. | |
| 2020/0082615 | A1 | 3/2020 | Reed et al. | |

OTHER PUBLICATIONS

Written Opinion of the International Searching Authority mailed on Nov. 14, 2019, issued in connection with International Application No. PCT/US2019/050184 (5 pages).

Office Action mailed Apr. 28, 2020, issued in connection with U.S. Appl. No. 16/564,586 (10 pages).

Notice of Allowance mailed Jan. 11, 2021, issued in connection with U.S. Appl. No. 16/564,586 (10 bages).

Kadobayashi, et al., "3D Viewpoint-Based Photo Search and Information Browsing," 28th Annual International ACM/SIGIR Conference on Research and Development in Information Retrieval (SIGIR 2005) (2 pages).

Extended European Search Report dated Jun. 20, 2022, issued by the European Patent Office in connection with European Patent Application No. 19857152.3 (12 pages).

Examination Report No. 1 dated Oct. 20, 2023, issued by the Australian Patent Office in connection with Australian Patent Application No. 2019336252 (3 pages).

Communication Pursuant to Article 94(3) EPC dated Jan. 2, 2025, issued by the European Patent Office in connection with European Patent Application No. 19857152.3 (10 pages).

Office Action dated Aug. 1, 2025, issued by the Canadian Patent Office in connection with Canadian Patent Application No. 3,111,070 (4 pages).

Examination Report No. 1 dated Dec. 5, 2025, issued by the Australian Patent Office in connection with Australian Patent Application No. 2024220113 (3 pages).

* cited by examiner

COMPUTER VISION SYSTEMS AND METHODS FOR END TO END IMAGE INSPECTION

RELATED APPLICATIONS

This application is a continuation of, and claims priority to U.S. patent application Ser. No. 16/564,586, filed on Sep. 9, 2019, and issued as U.S. Pat. No. 10,957,101 on Mar. 23, 2021, which claims priority to U.S. Provisional Patent Application Ser. No. 62/728,337 filed on Sep. 7, 2018, the entire disclosures of which are hereby expressly incorporated by reference.

BACKGROUND

Technical Field

The present disclosure relates generally to the field of computer modeling of structures and property. More specifically, the present disclosure relates to systems and methods for end-to-end image inspection.

Related Art

Accurate and rapid identification of objects appearing in digital images (e.g., aerial images, satellite images, ground-based images, etc.) is increasingly important for a variety of applications. For example, information related to the roofs of buildings is often used by construction professionals to specify materials and associated costs for both newly-constructed buildings, as well as for replacing and upgrading existing structures. Further, in the insurance industry, accurate information about structures may be used to determine the proper costs for insuring buildings/structures, building inspection, and estimating repair costs. Still further, government entities can use information about the known objects in a specified area for planning renovations.

Viewing the images through normal means has inherent deficiencies that can prevent an effective inspection and analysis of the imagery. For example, a known deficiency is the lack of context of the structures and objects contained in the imagery, where such structures and objects are located relative to other structures and objects, and where they are located in specific coordinates. Further, images are often taken very close to a roof surface to provide a resolution sufficient to show damage or other concerns. As such, many of the images will show only roofing materials that are very similar in appearance, which would make it difficult and not practical for a user to determine which face of the roof is represented by a given image. Therefore, the ability to generate accurate and complete models and images that indicate location data, as well as structural or cosmetic damage, is a powerful tool. Accordingly, the computer vision systems and methods disclosed herein solve these and other needs by providing image capturing and model generating methods as well as an interactive environment for viewing the images/models and making annotations.

SUMMARY

This present disclosure relates to systems and methods for end-to-end image inspection. Image sources can include, but are not limited to, aerial imagery, satellite imagery, ground-based imagery, imagery taken from unmanned aerial vehicles (UAVs), mobile device imagery, etc. The disclosed system can perform an image acquisition phase where the system captures or derives contextual metadata for one or more images. The system can then perform an image alignment phase where the system aligns each image with three-dimensional ("3D") models of objects and structures represented in the image. Finally, the system can generate an interactive environment which provides a user with the ability to view images aligned with a contextual model in two dimensional ("2D") and 3D views, and to make annotations.

BRIEF DESCRIPTION OF THE DRAWINGS

The foregoing features of the invention will be apparent from the following Detailed Description of the Invention, taken in connection with the accompanying drawings, in which:

FIGS. 19-21 are diagrams illustrating annotations being used as input in scoping tools and to generate reports.

DETAILED DESCRIPTION

The present disclosure relates to computer modeling systems and methods for end to end image inspection as described in detail below in connection with FIGS. 1-22.

The embodiments described below relate to generating an interactive environment for annotating the roof of a structure that received damage from weather elements, such as hail and wind. It should be understood that any reference to the roof of the structure or the weather elements is only by way of example, and that the systems, methods and embodiments discussed throughout this disclosure may be applied to any structure, including but not limited to, roofs, walls, buildings, awnings, houses, decks, pools, roads, utilities (e.g., telephone and electric posts, pipes, etc.), temporary structures such as tents, motor vehicles, foundations, etc.

Figure 1:
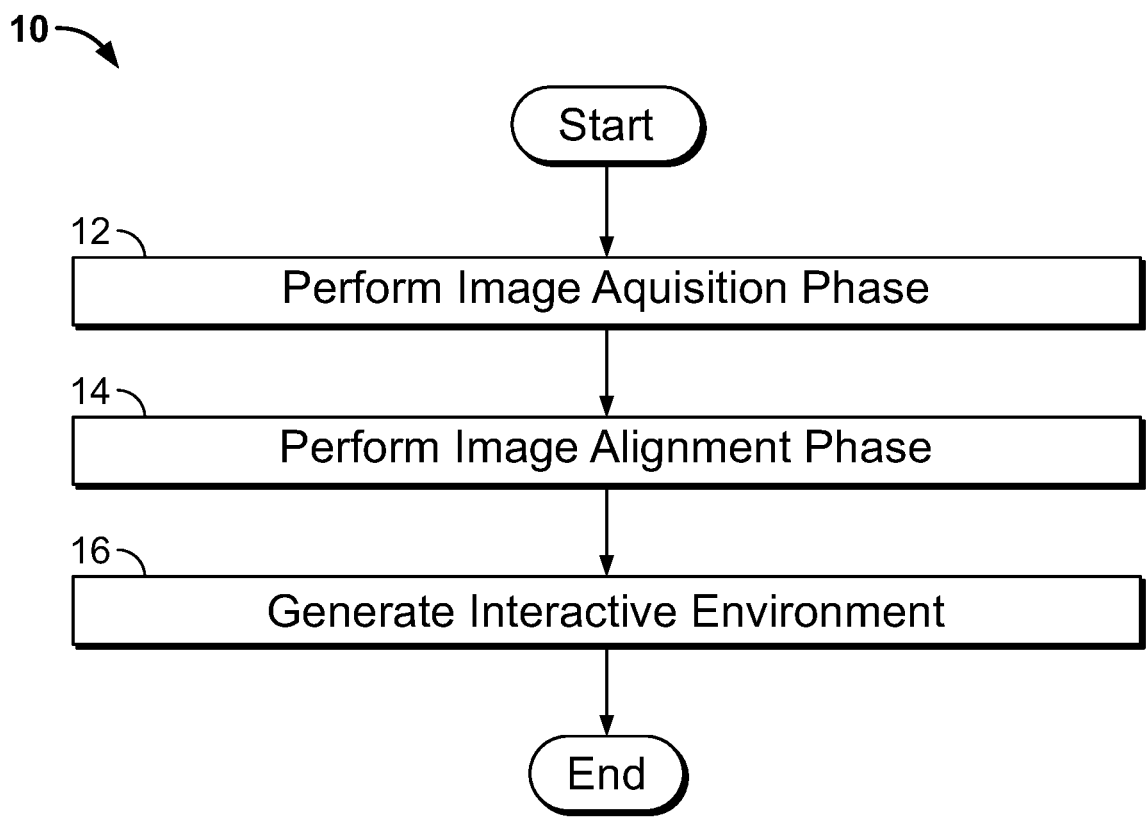
FIG. 1 is a flowchart illustrating overall process steps carried out by the system of the present disclosure.

FIG. 1 shows a flowchart illustrating the overall process steps being carried out by the system, indicated generally at method 10. In step 12, the system performs an image acquisition phase. The image acquisition phase captures or derives contextual metadata for one or more images. In step 14, the system performs an image alignment phase. The image alignment phase aligns each image with three dimensional ("3D") models of objects and structures represented in the image. In step 16, the system generates an interactive environment. The interactive environment provides a user with the ability to view images aligned with a contextual model in two dimensional ("2D") and 3D views, and to make annotations. Each step of FIG. 1 will be described in greater detail below.

It should be understood that FIG. 1 is only one potential configuration, and that the system of the present disclosure can be implemented using a number of different configurations. The process steps of the invention disclosed herein could be embodied as computer-readable software code executed by one or more computer systems, and could be programmed using any suitable programming languages including, but not limited to, C, C++, C#, Java, Python or any other suitable language. Additionally, the computer system(s) on which the present disclosure may be embodied includes, but is not limited to, one or more personal computers, servers, mobile devices, cloud-based computing platforms, etc., each having one or more suitably powerful microprocessors and associated operating system(s) such as Linux, UNIX, Microsoft Windows, MacOS, etc. Still further, the invention could be embodied as a customized hardware component such as a field-programmable gate array ("FPGA"), application-specific integrated circuit ("ASIC"), embedded system, or other customized hardware component without departing from the spirit or scope of the present disclosure.

Returning to step 12, the system receives digital images having metadata. The metadata can include camera intrinsic and extrinsic values. The metadata includes data to place imagery (e.g., the images) in a global coordinate system, such that it can be correlated or otherwise aligned with one or more 3D models. Devices used to capture the imagery can also capture varying types of metadata at various levels of precision, such as, but not limited to, Global Positioning System ("GPS") data, a timestamp, an elevation, etc. The imagery can include, but is not limited to, satellite imagery, aerial imagery from manned aircraft or unmanned aircraft, and imagery taken from the ground. The system can further derive metadata and/or refine the metadata to a required precision. The additional processes can include automated and/or manual processes that determine a correlation between the images, and using photogrammetric and other methods to derive or refine the metadata. The refinement process can also include steps to alter the metadata such that the imagery aligns with preexisting 3D models and objects that are shown in the imagery.

Figure 2:
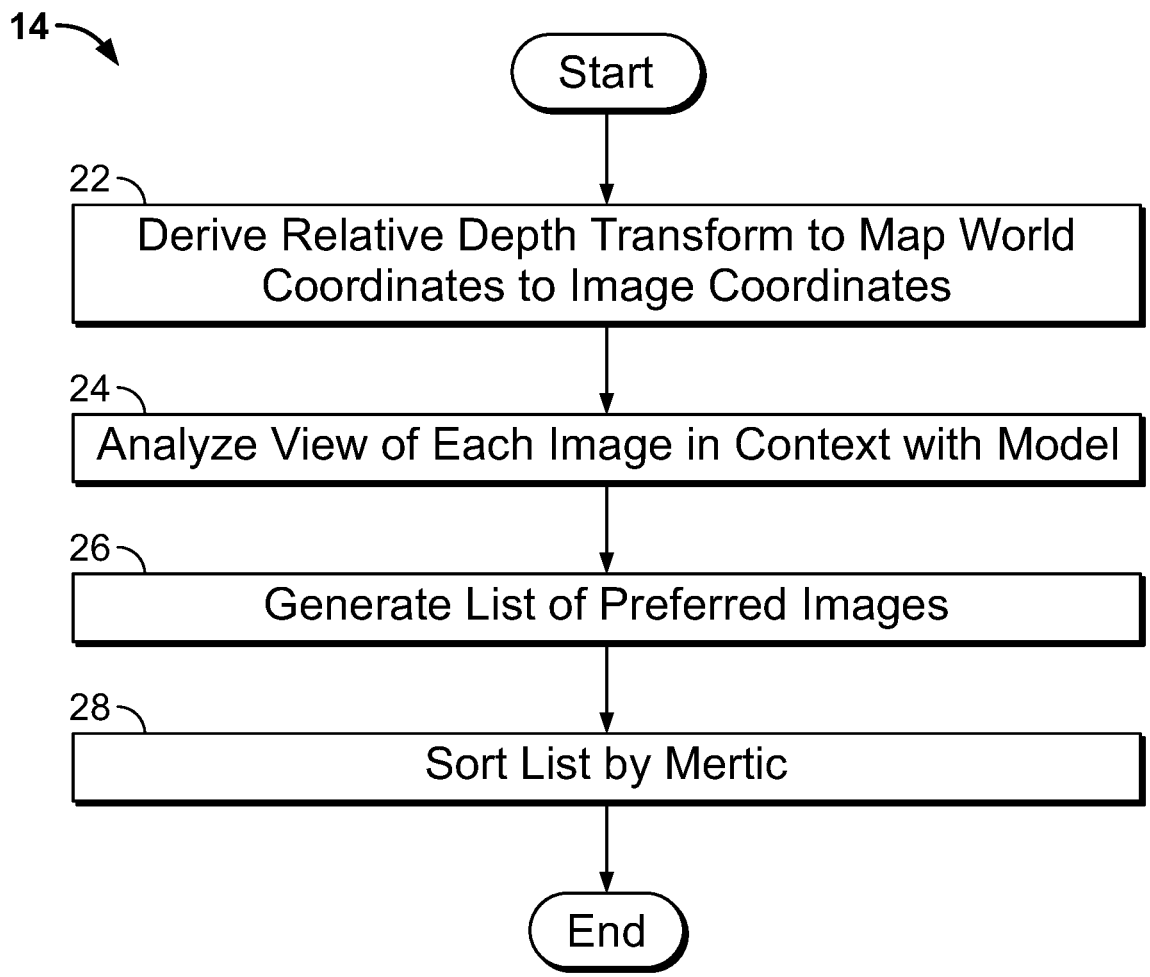
FIG. 2 is flowchart illustrating the image alignment process of FIG. 1 in greater detail.

In step 14, the system derives "transforms" from the metadata for each image. FIG. 2 is a flowchart illustrating step 14 of FIG. 1 in greater detail. In step 22, the system derives, from the metadata, a relative depth transform to map world coordinates to image coordinates, represented as (W→I). A relative depth transform is an affine transform that preserves a sense of distance from model point to camera so that depth tests can be performed in, for example, 3D rendering engines. From the model information, the system can calculate another transform to map model coordinates to world coordinates, represented as (M→W). Combining the transforms, the system generates a model to image transform, represented as (M→I). The inverses of the transforms are represented as (I→W) (W→M)=(I→M).

In step 24, using the transforms, the system analyzes a view of each image in context with the model. During this analysis, the system processes the camera position and orientation relative to model coordinates using, for example, the transform (I→M). The system can further generate a model surface relative to image coordinates using, for example, the transform (M→I).

In step 26, the system generates a list of preferred images for each model surface. To determine the preferred images for a surface, the system analyzes each image for inspection characteristics of that surface by using the transforms. If an image view does not include the model surface in its frame, or if the surface is facing away from the camera, the system can elect to exclude the image from the preferred list.

In step 28, the system sorts the list by a metric that can include, but is not limited to, camera distance to surface, camera orientation, surface orientation, surface area, area of visible surface, image pixel area, pixel area of visible surface, location of surface in image coordinates, location of projected image in surface coordinates, and surface shape. The area of visible surface is an area of the surface in model space after it has been clipped by other geometry and an image rectangle. The pixel area of visible surface is the area of the surface in image space after it has been clipped by other geometry and an image rectangle. The location of a projected image in surface coordinates is where the camera was pointed when the image was captured so that it can be compared to other cameras.

Figure 3:
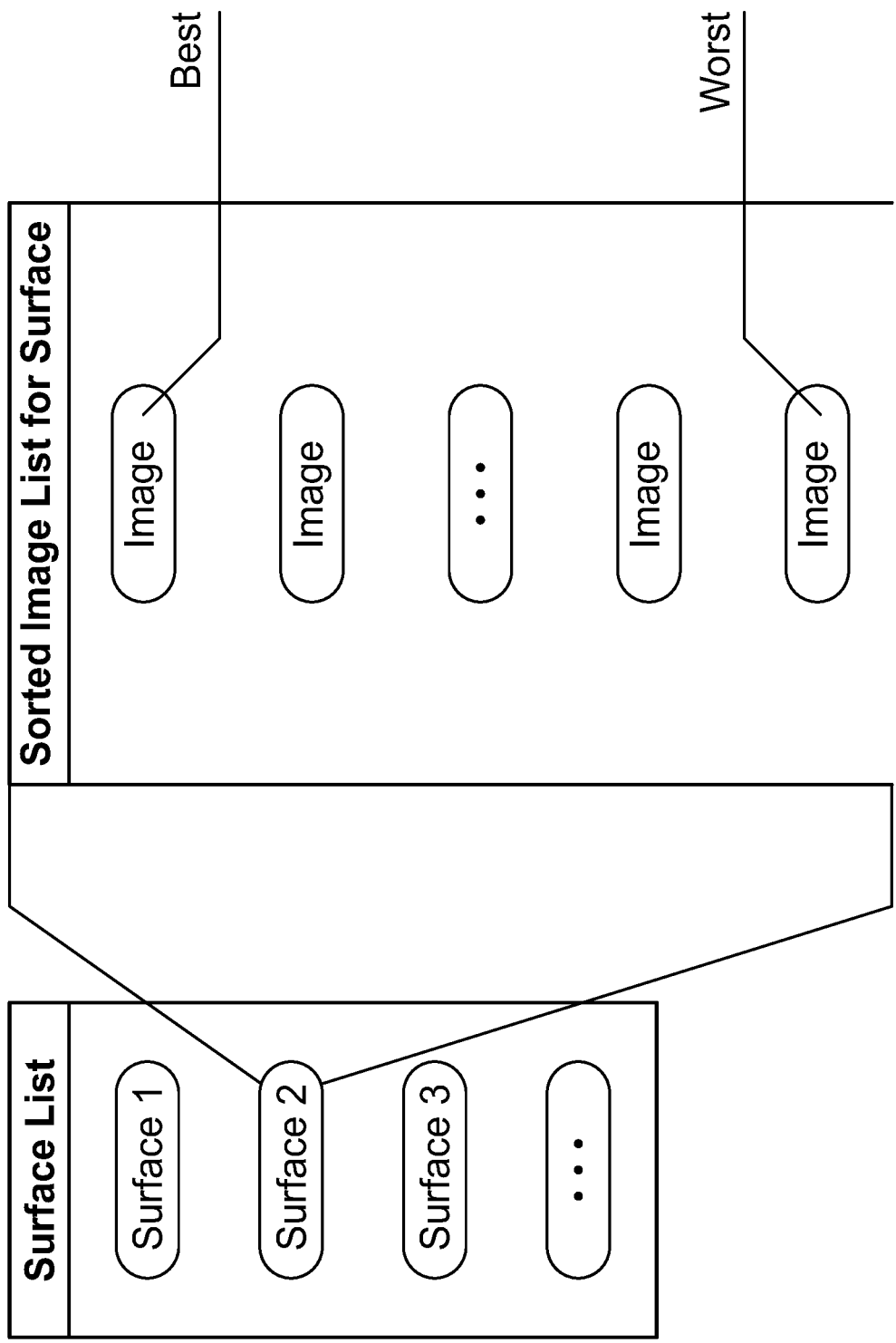
FIG. 3 is a diagram illustrating correspondences between surfaces and images.
Figure 4:
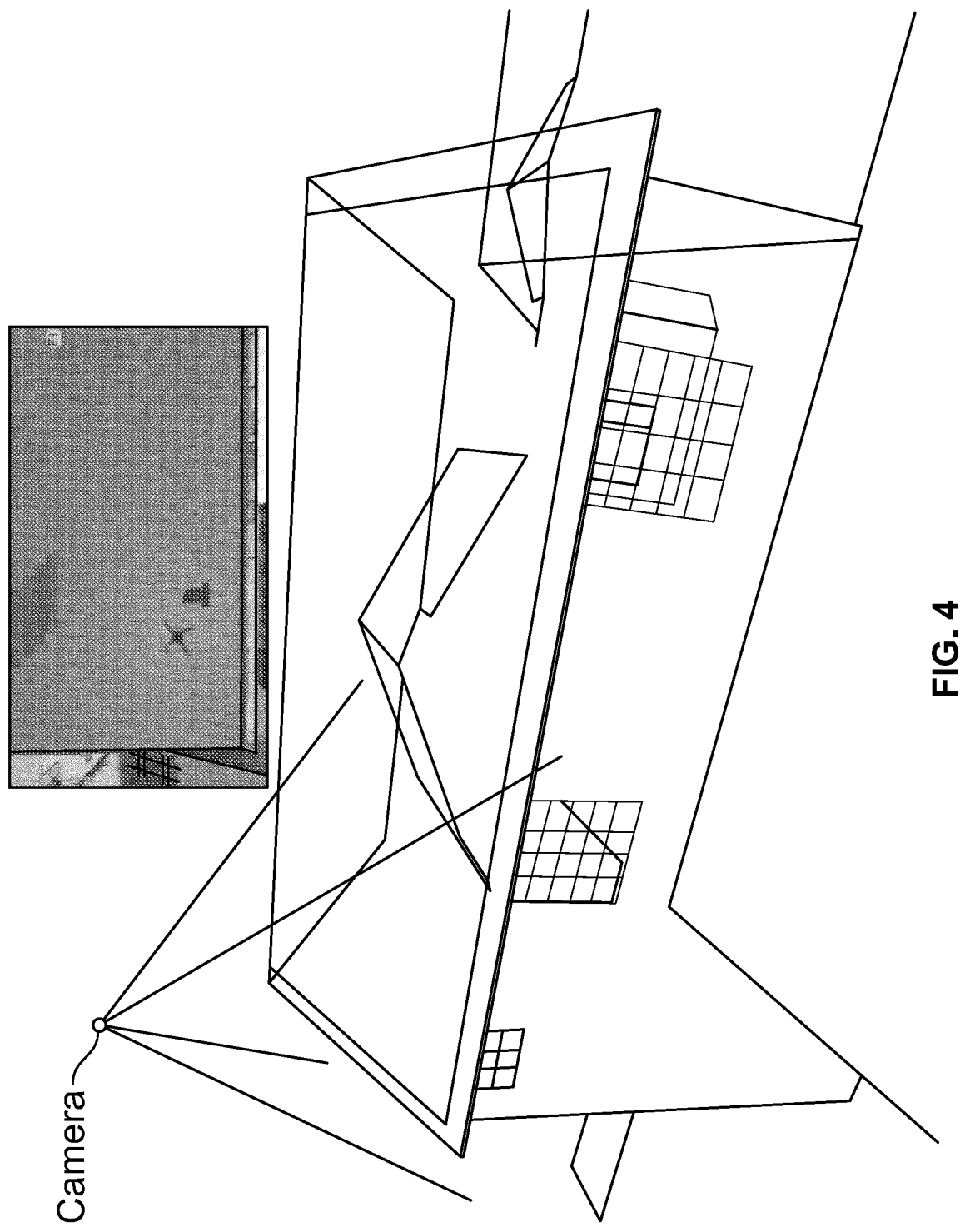
FIG. 4 is a diagram illustrating a camera and an image frame relative to a model of a structure.
Figure 5:
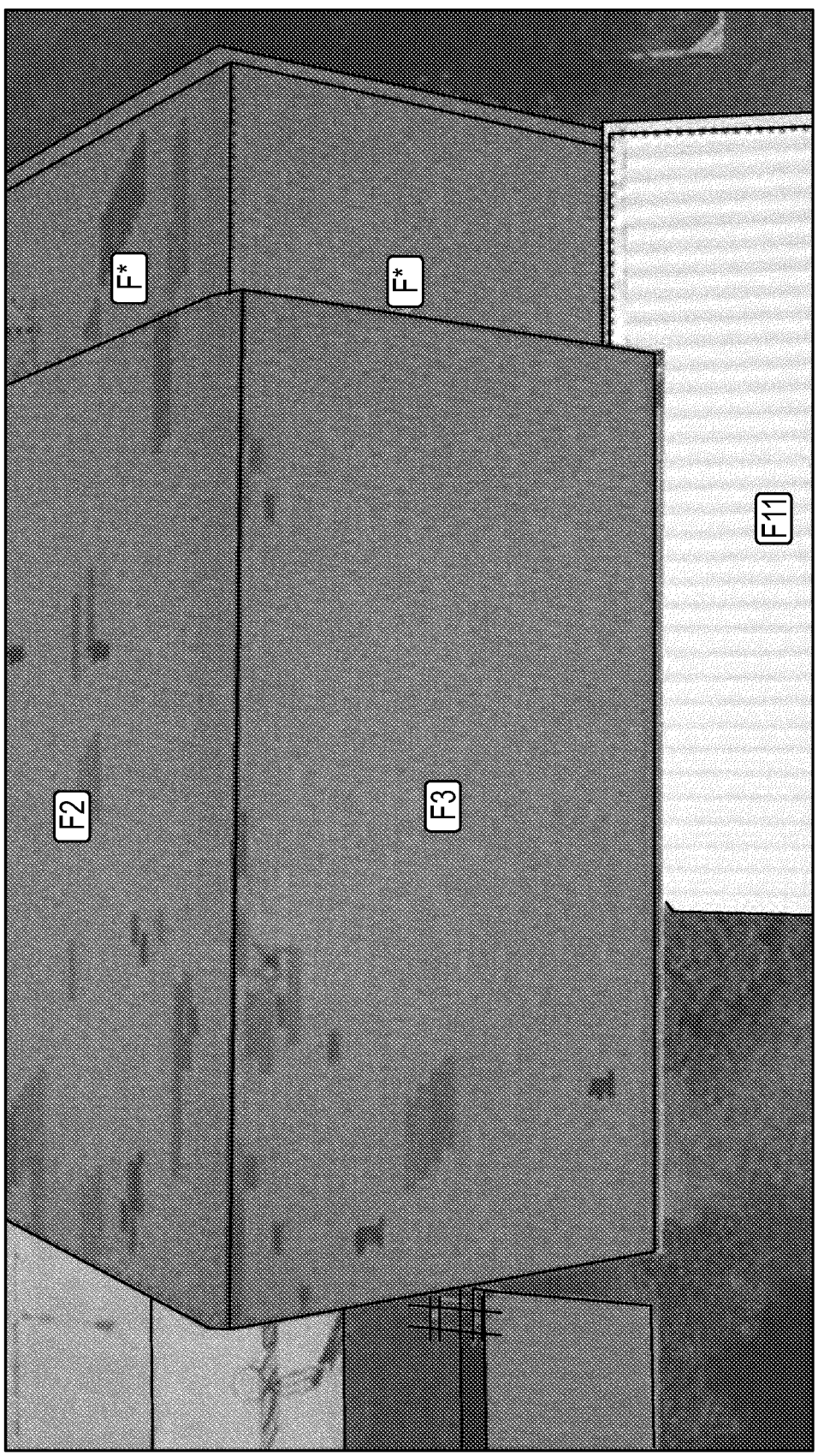
FIG. 5 is a diagram illustrating an example of an image having complete coverage of surface "F1"

The list of surfaces each have a sorted list of images. Each image has a transform that can be used to project the full model onto the image. The inverse of that transform can be used to determine a location on the model that an image coordinate corresponds to. FIG. 3 is an illustration showing a surface to images correspondence performed by the system. For each model surface, a texture is generated from ideal images. An ideal image for texturing is determined by, for example, surface visibility and pixel size on surface. FIG. 4 is an illustration showing a camera and an image frame relative to a model. FIG. 5 is an illustration showing an example of an image with complete coverage of surface "F1".

Figure 6:
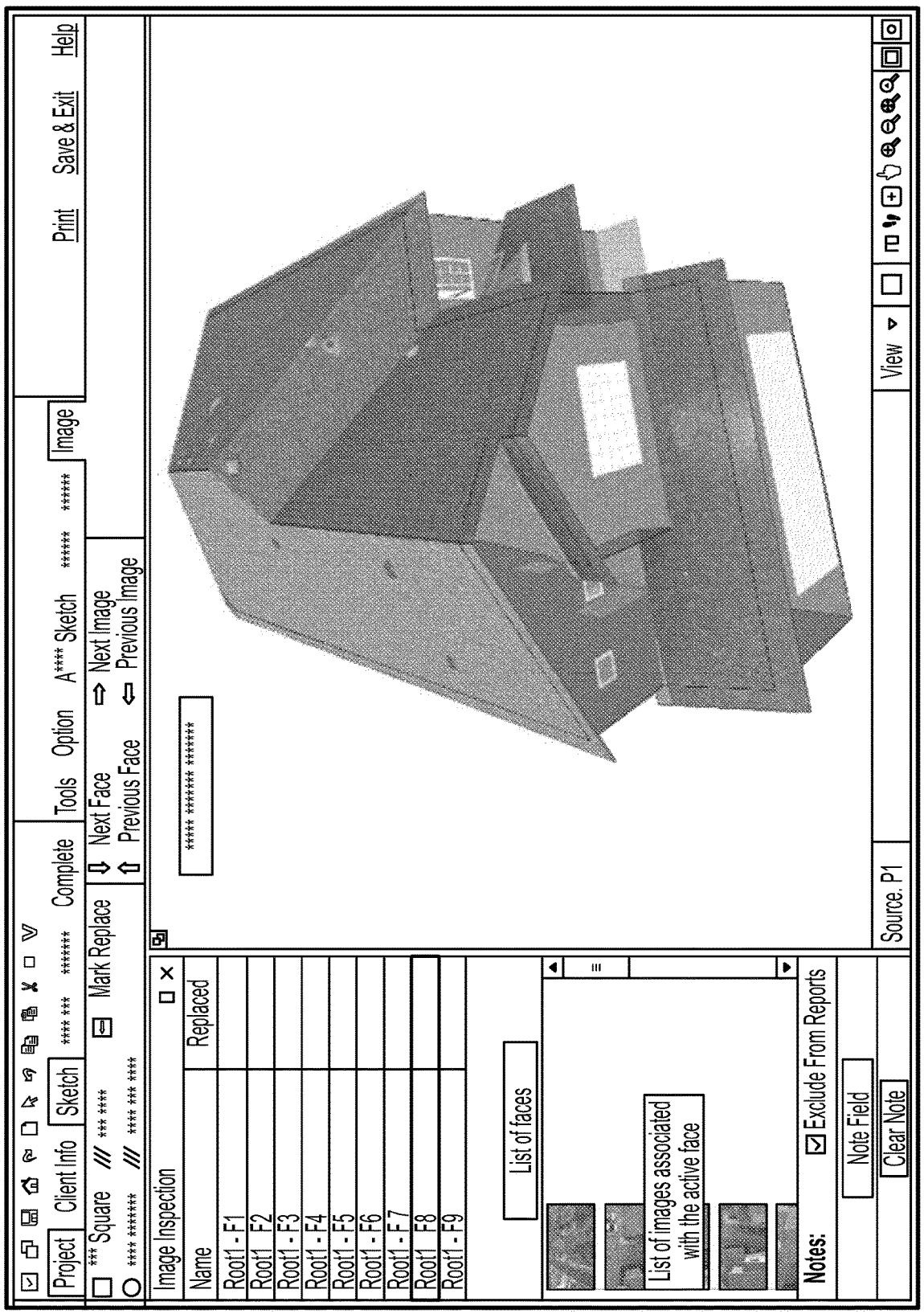
FIG. 6 is a diagram illustrating a viewing environment of the system, operating in a 3D mode.
Figure 7:
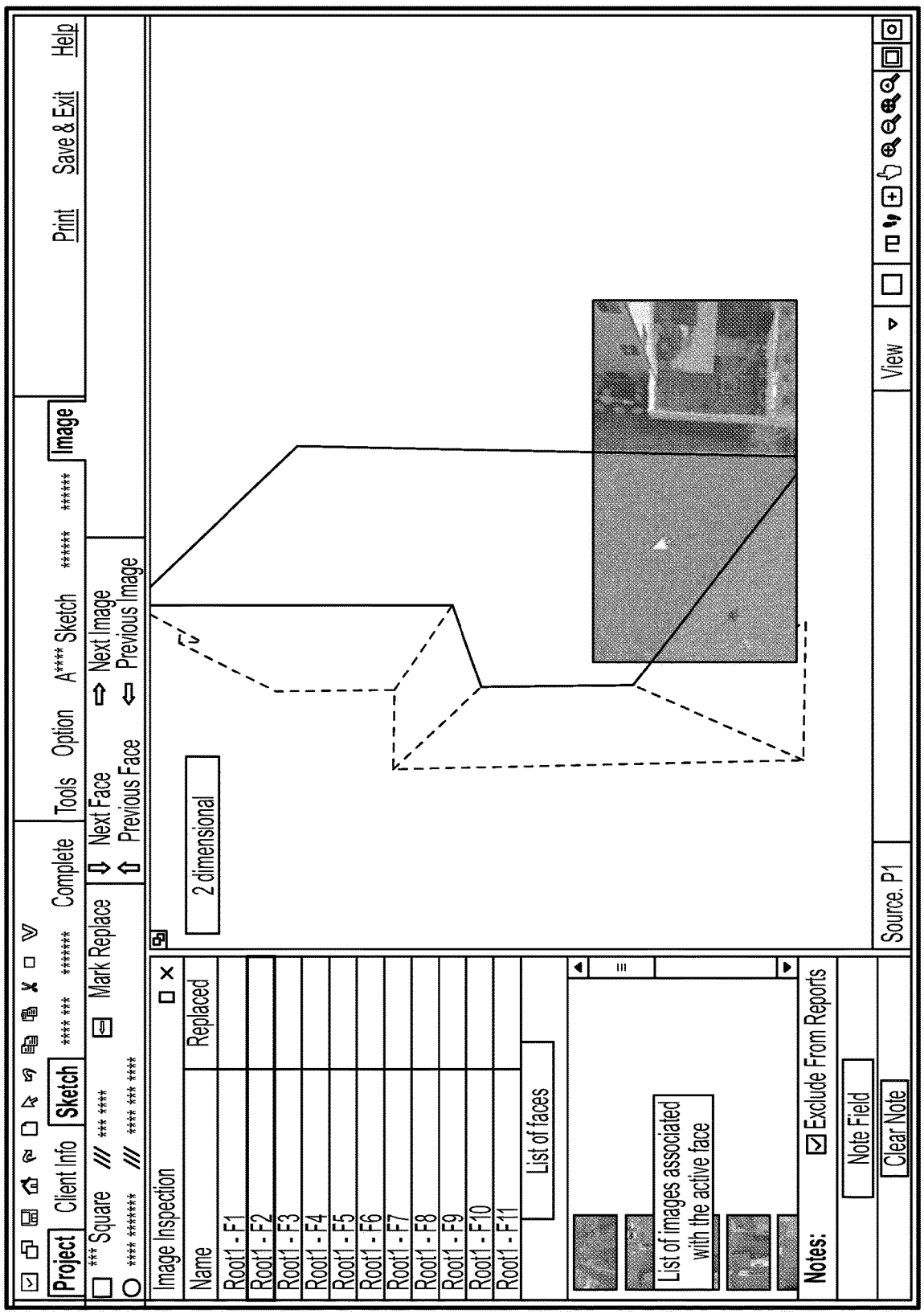
FIG. 7 is a diagram illustrating the viewing environment of the system, operating in a 2D mode.

Returning to FIG. 1, in step 16, the system generates the interactive environment, which is illustrated in FIGS. 5-21. The interactive environment can include a workspace, a surface list, an image list, and image notes. The workspace is an area for viewing and annotating the imagery, model, and objects. The workspace has options to display in a 3D and 2D mode. The surface list is a list where each row contains a text label that corresponds to the surfaces that make up the model and/or objects. Those skilled in the art would understand that additional data relevant to each surface can be displayed as well. The image list is a list of images that is filtered to show the images relevant to the currently selected face. A reduced size "thumbnail" can be shown in the list to represent each image. The image notes are a field where notes can be entered that are relevant to the image currently selected in the image list. FIG. 6 is an illustration showing the viewing environment in the 3D mode. FIG. 7 is an illustration showing the viewing environment in the 2D mode.

Figure 8:
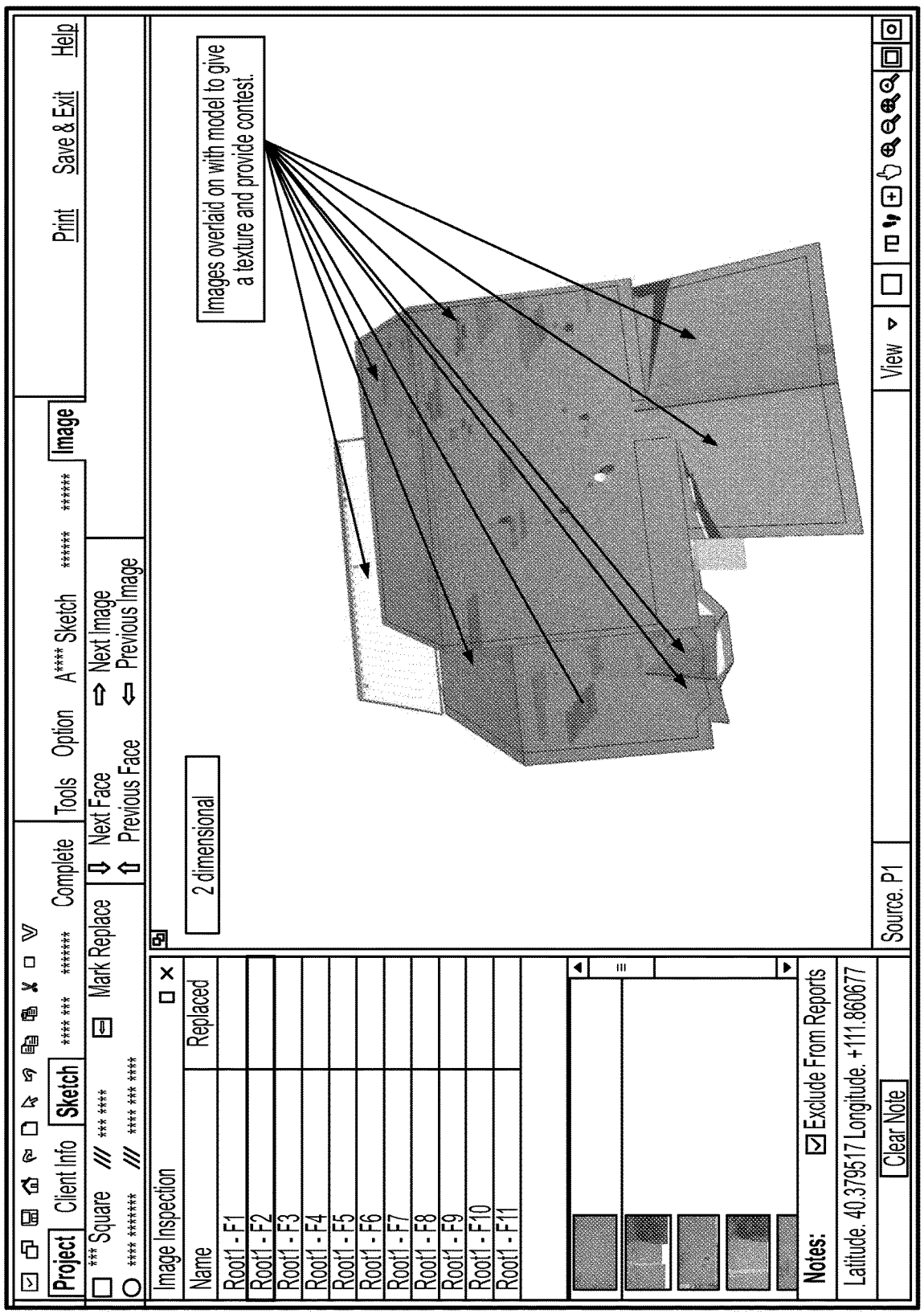
FIG. 8 is a diagram illustrating surfaces of a 3D model generated by the system.

In the 3D view mode, the model and objects are displayed and the user can manipulate the viewing angle such that it is possible to view the model from all possible angles and zoom levels. The surfaces of the model are textured with sections of imagery that aligns with the model and have been selected to provide optimal context, as can be seen in FIG. 8. A mechanism is provided to select individual surfaces.

Figure 9:
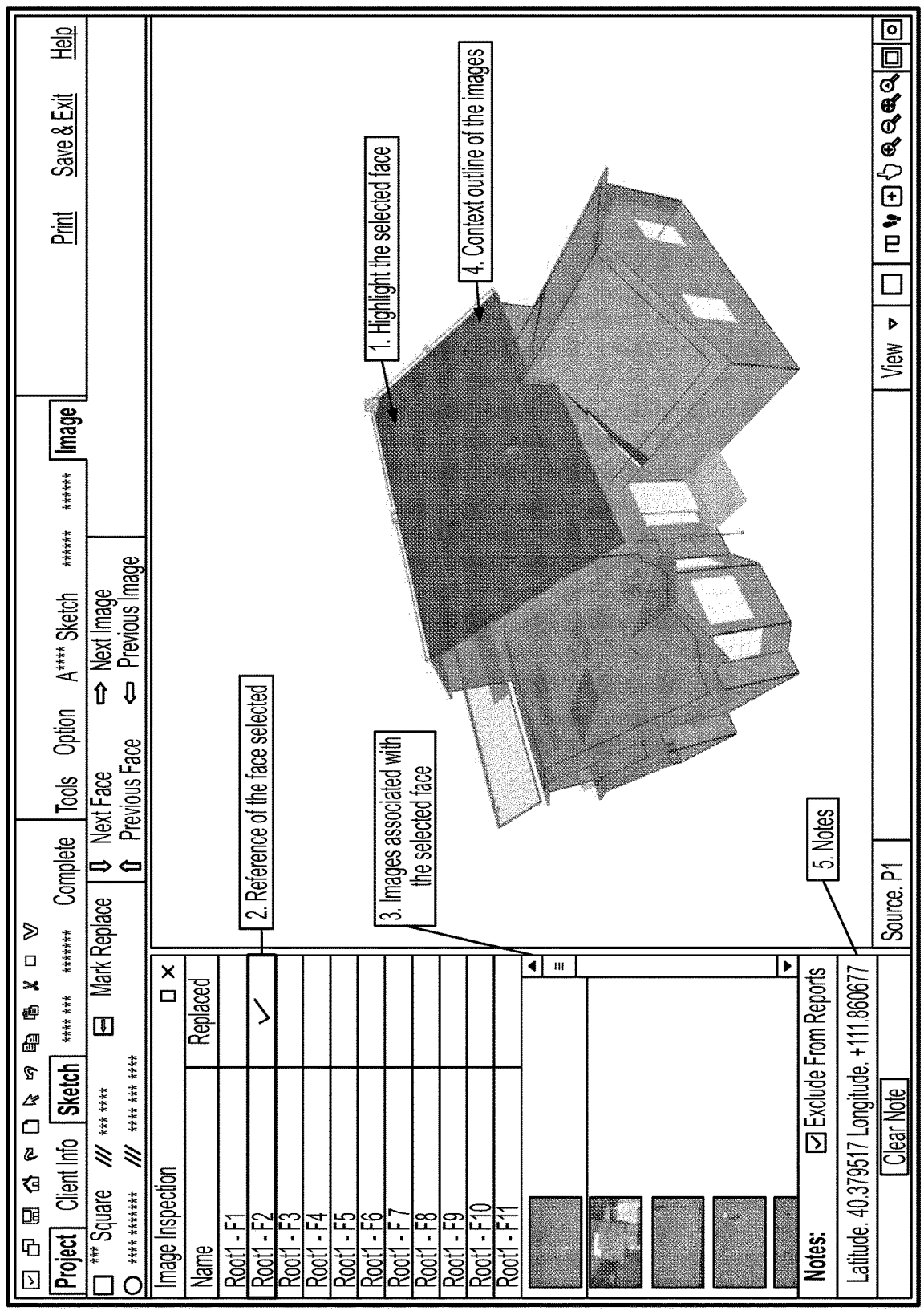
FIGS. 9-11 are diagrams illustrating the system performing various functions on the model.
Figure 10:
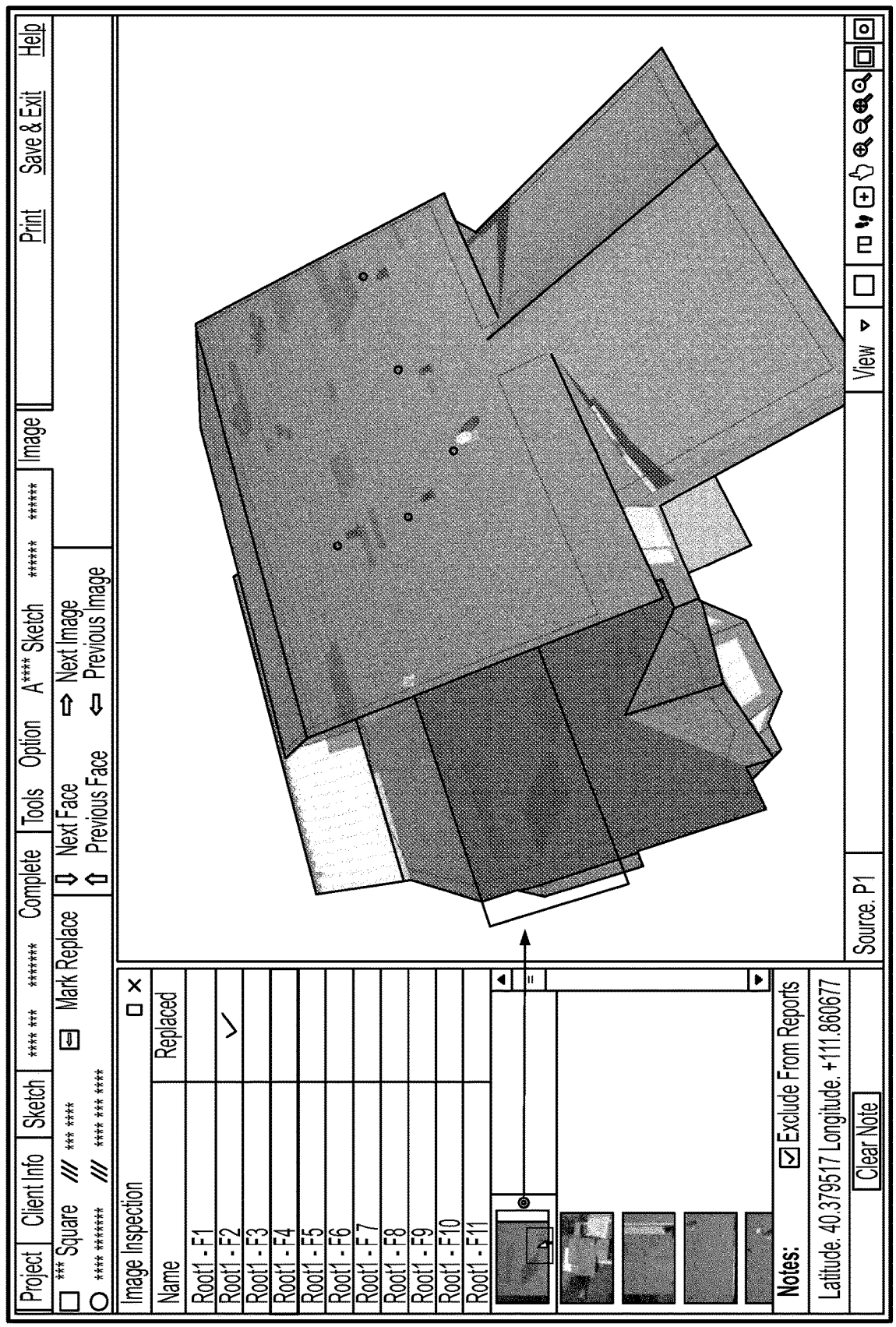
Figure 11:
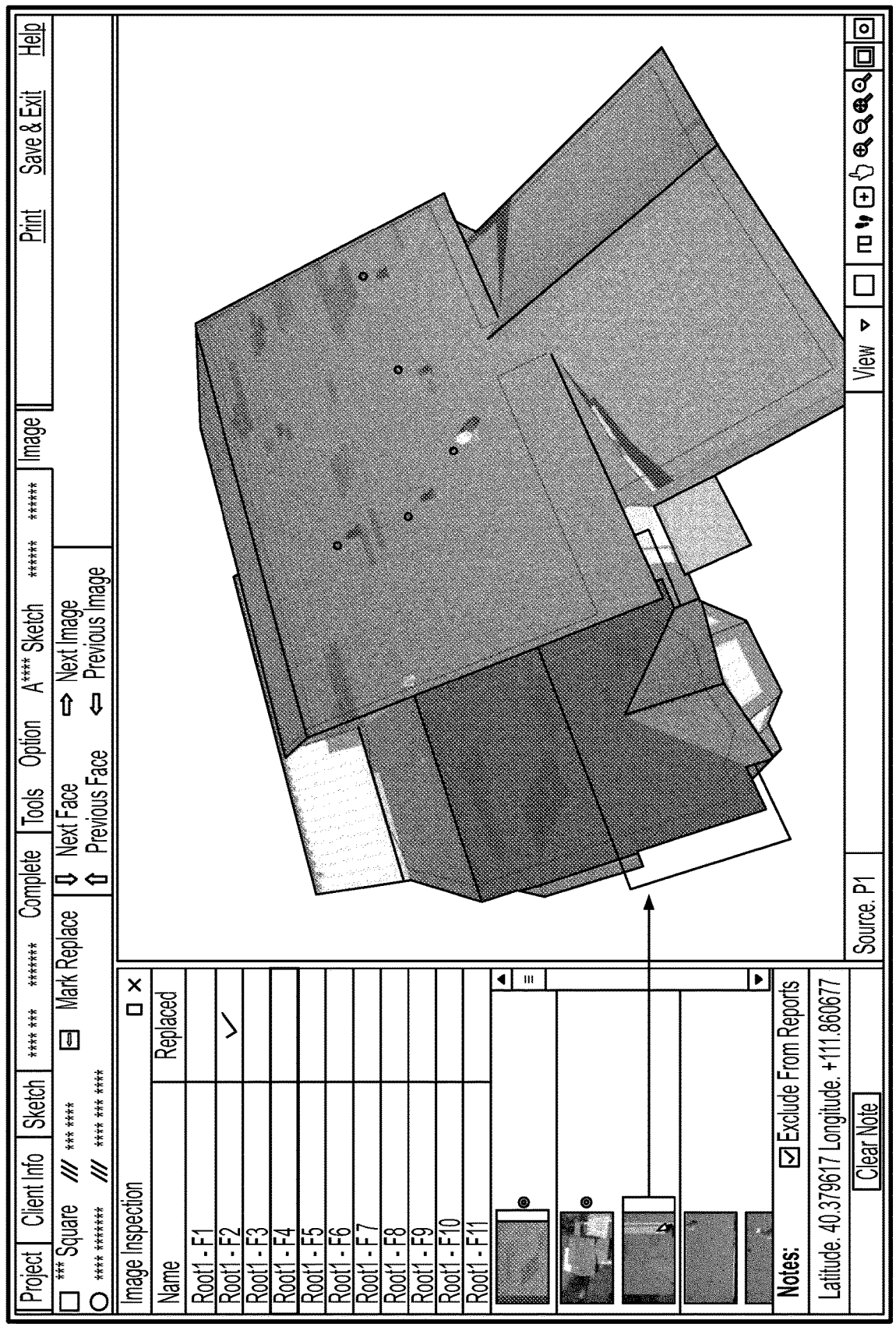

When a surface is selected by the user, the system can perform the following functions: highlight the selected surface in the workspace, highlight the entry in the surface list that corresponds to the selected surface in the workspace, change the image list to show the images that are relevant to the selected face and sorted such that the images best suited for inspection are at the top of the list, draw a polygon representing the bounds of the image in the workspace on the same plane as the selected surface in 3D space for the image selected in the image list, and update the image notes that are associated with the selected surface either manually or automated. Those skilled in the art would understand that the above list is not exclusive, and that the system can perform additional functions. FIGS. 9-11 are illustrations showing the above-discussed functions.

Figure 12:
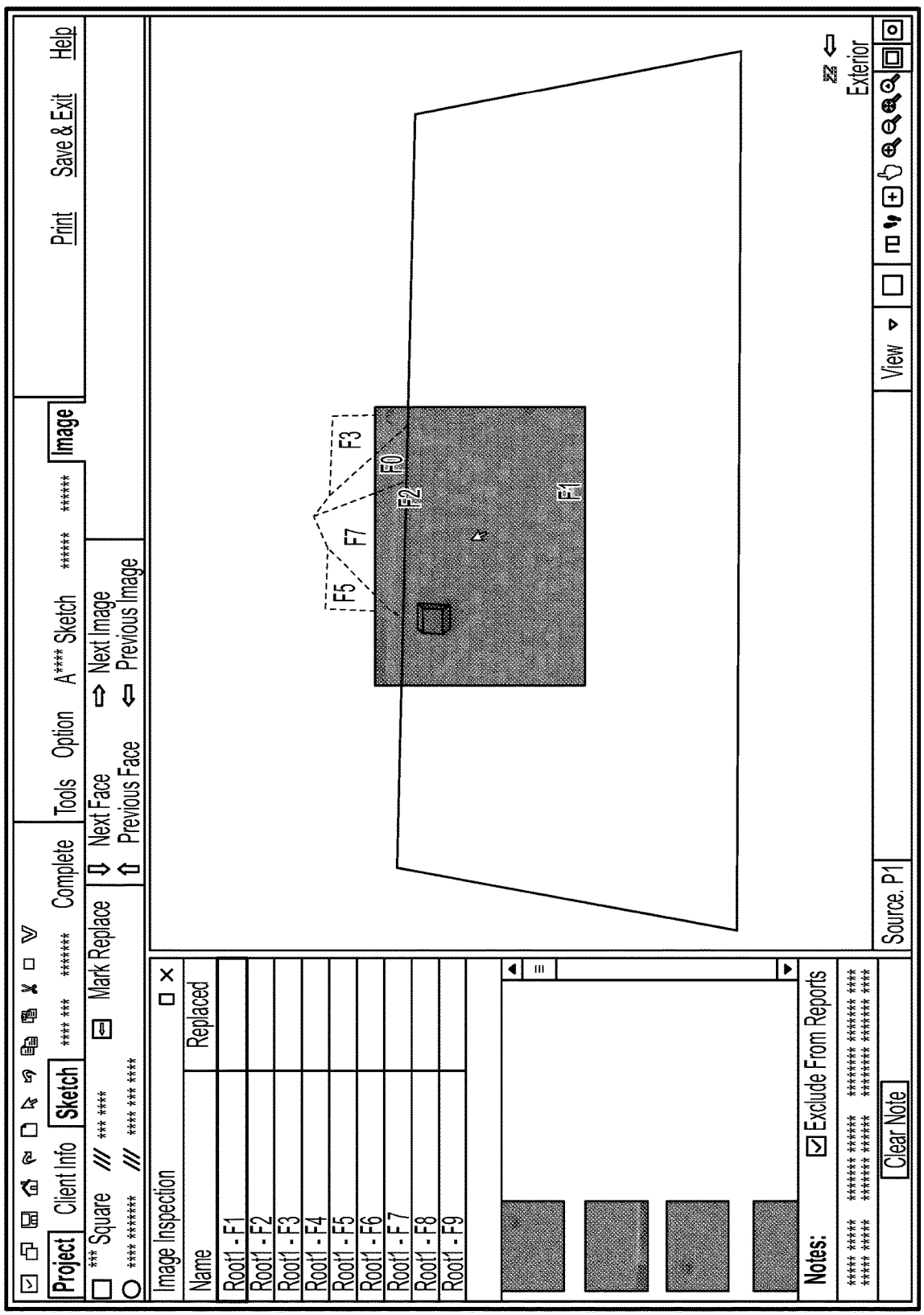
FIGS. 12-14 are diagrams illustrating the model and images being manipulated by the system in the 2D mode.
Figure 13:
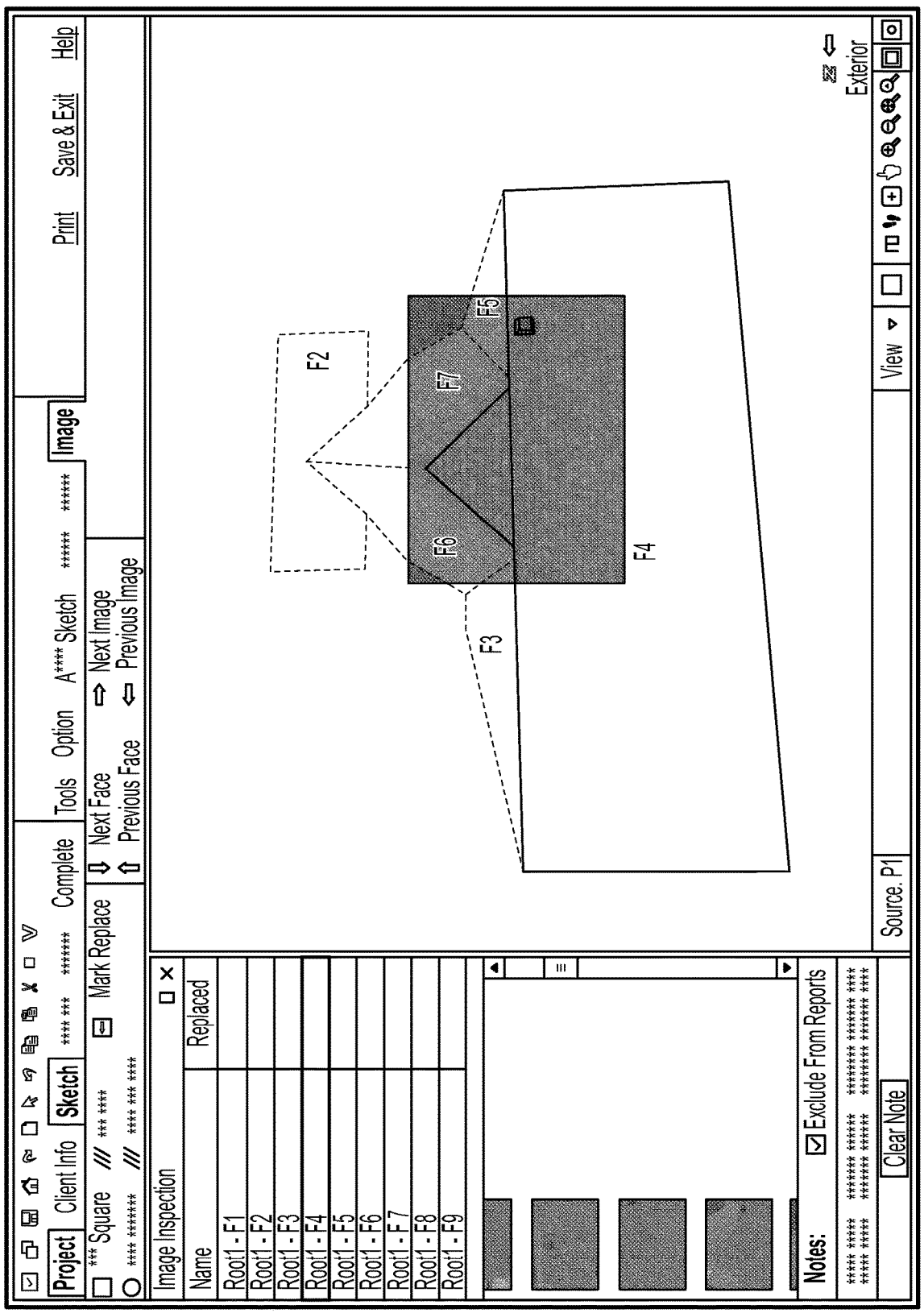
Figure 14:
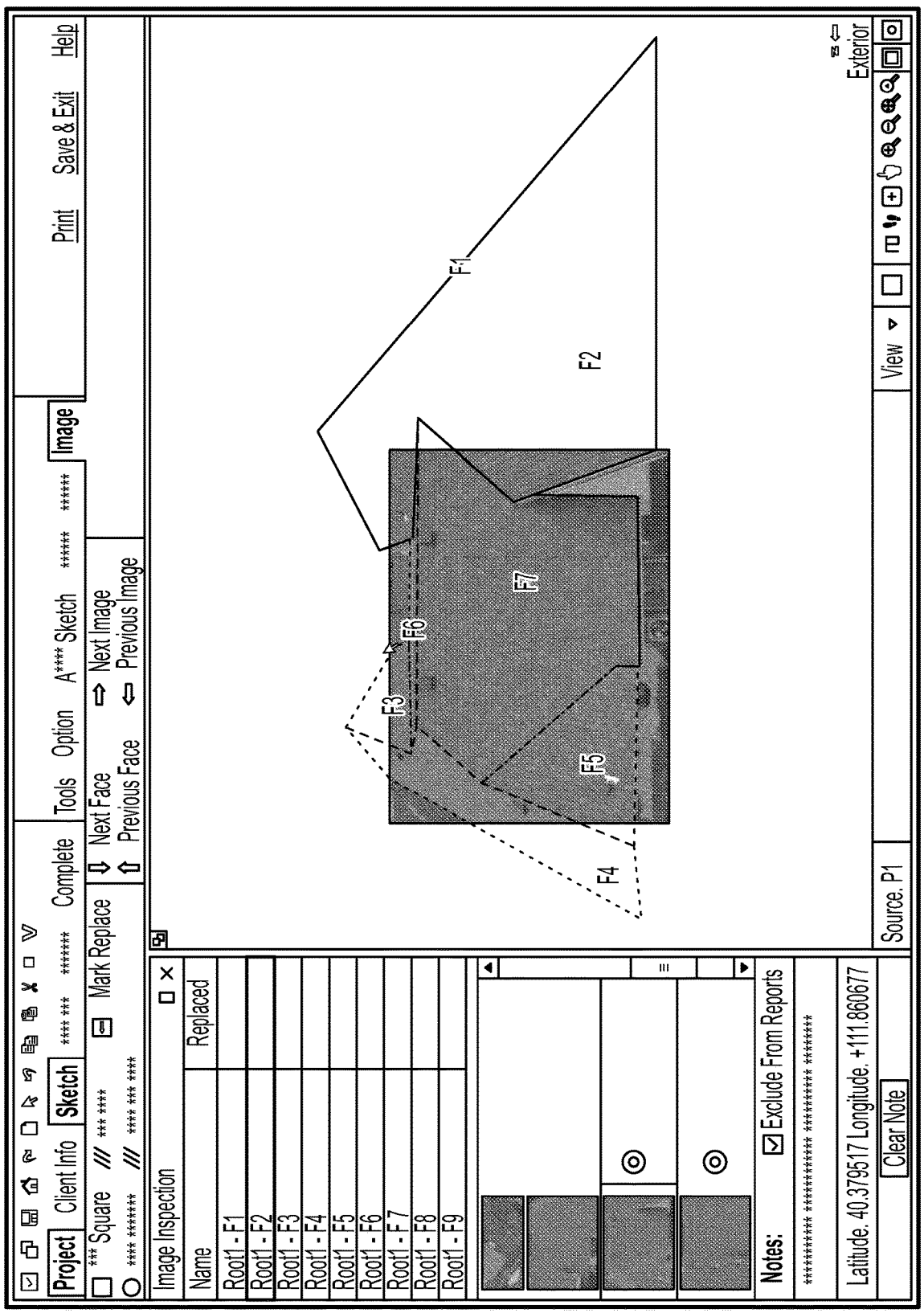

The system includes a mechanism to switch between the 3D mode and the 2D mode in the workspace. When in the 2D mode, the workspace displays the image currently selected in the image list. The model and/or objects contained in and surrounding the image are drawn on top of the image as a 2D projection in alignment with the image. The image is displayed in a best view for analysis while still allowing a user to view the context from the model. Further, the view can be zoomed out to gain more context by seeing more of the 3D model that extends off the image. FIGS. 12-14 are illustrations showing the model in the 2D mode.

To distinguish one surface from another, each surface can have a specific identification ("ID"). The surface list can have a row for each surface that displays the surface ID. Selecting the surface in the list will have the same result as selecting the corresponding surface in the 3D view in the workspace. Other information relevant to the surface can also be displayed in the surface list. For example, an indicator can be added stating that the damage is such that the surface was marked for replacement. The entries in the list can show an indicator when the surface has been inspected.

All the associated images are visible in the image list. Each image is selectable, and the image list can be filtered to show the most relevant images first. When the user wishes to change the image in 2D mode, the user can select the desired image in the image list. The selecting would adjust the view to show the selected image overlaid with the model. After the image is viewed, an icon can appear indicating that that image has been viewed.

Figure 15:
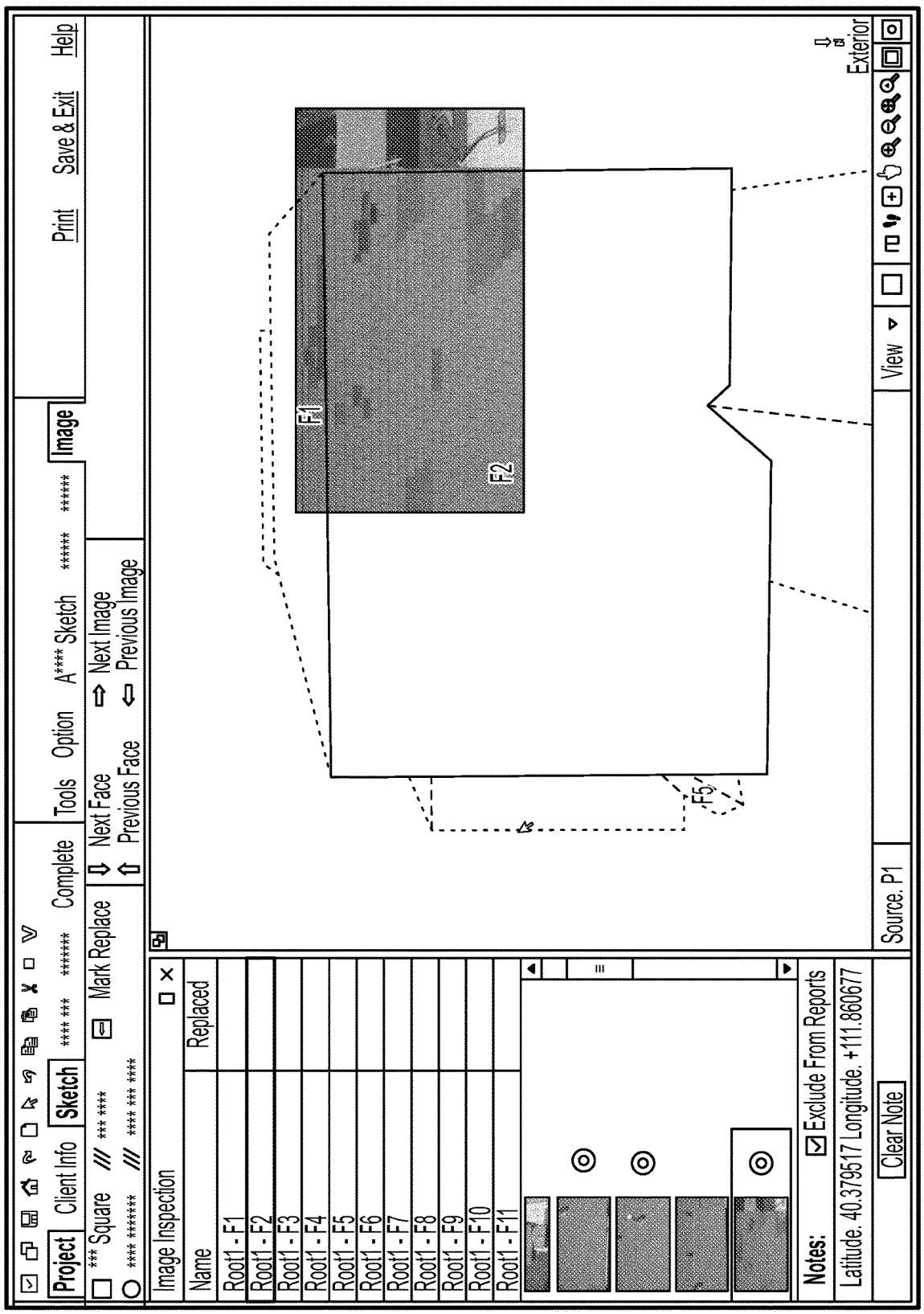
FIG. 15 is a diagram illustrating menu options for annotate tools.

The system includes optional tools for the user to annotate damage or other concerns in the image. The annotations can become part of both or either the 3D model and the 2D image, for use in generated reports. The annotation data can also be used as input into other tools that facilitate determining the methods and costs for repairing the roof or other areas of the structure. FIG. 15 is an illustration showing a menu option in top left corner.

The system can generate a test square on the face of a roof. In an example, the test square is a 10'×10' area. Visible damages within the test square will be marked. This can be done as a sample, representing the condition and damages of the entire face or roof. When the damage marks exceed a predetermined threshold, the roof face and/or the connected faces can be replaced. When the damage marks do not exceed the predetermined threshold, the face and/or the connected faces are repaired. In an example, repairing can include the system dividing the damage marks by 100 and then multiplying by the area of the face to generate a sum. The sum represents the estimated total damaged shingles on the roof face and/or the connected faces.

Figure 16A:
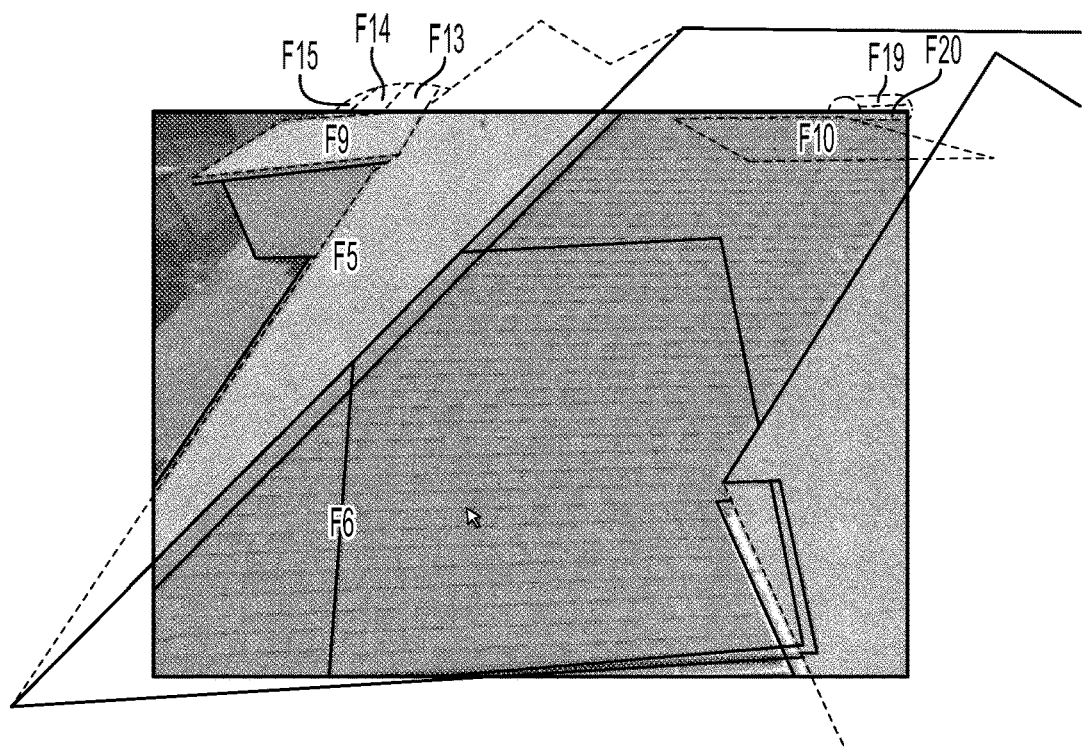
FIGS. 16A and 16B are diagrams illustrating a test square being applied to a model.
Figure 16B:
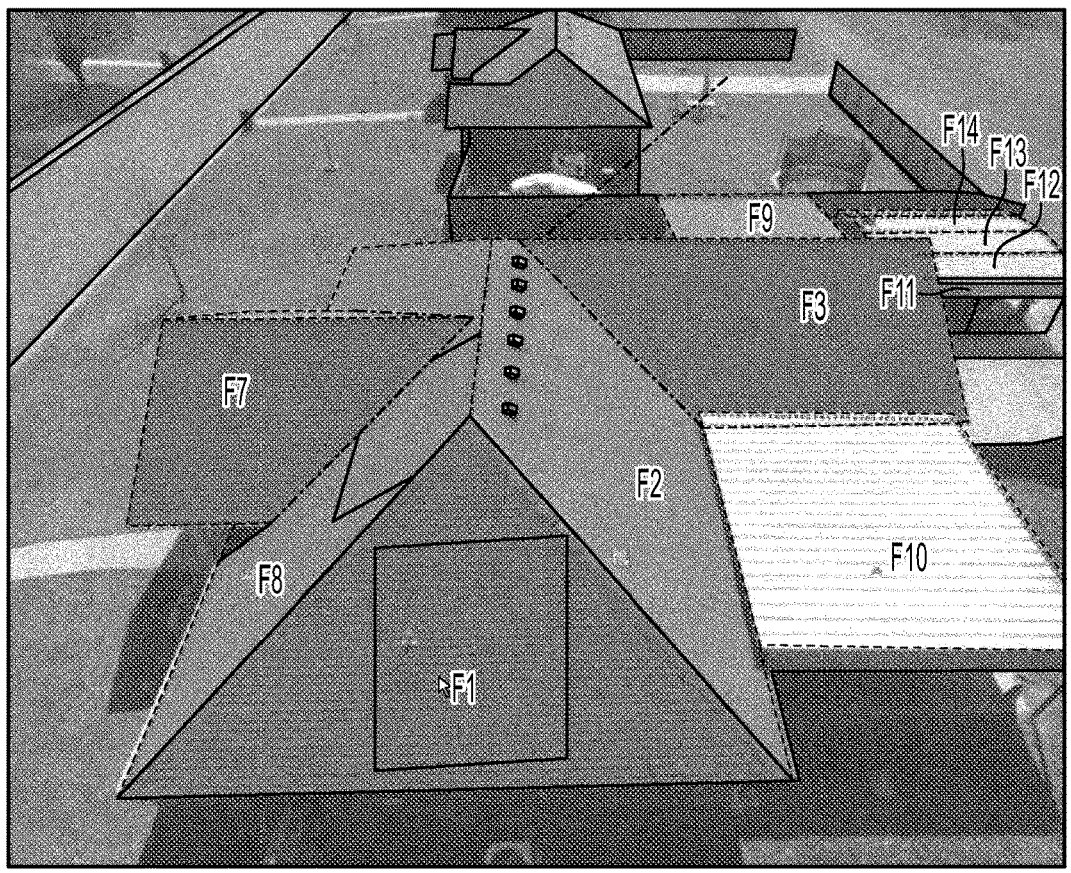

The system further includes a mechanism to apply the test square in a digital environment. For example, a user can place/move a test square on a model. The test square can also be conforming. For example, the test square can shape itself to the roof edges as needed, while maintaining a 100 foot area (e.g., a 10'×10' area). The user can place annotations representing damage. The faces can be marked as replace or repair. FIGS. 16A and 16B illustrate application of the test square to a model. The system can base the above discussed procedure on individual damage(s) or a damage area.

In another example of the system, the user can place damage annotations first and the system will place the test square based on a position of a minimum set of annotations. The user can continue placing annotations as needed. In addition, a number or area of damage annotations can be calculated per square foot without a user defined test square. Once a user defined threshold is exceeded, the user would be notified.

It should further be noted that as each annotation is added to the model, a note will be automatically added referencing, for example, type of damage annotations, a face the annotations were added to, a repair action needed, a reference area the repair/replace actions were determined by, test square area vs face area, etc. All auto notes are added to the image and all images associated with the face that are used in a report carry the auto note. If an image is used multiple times for different faces, multiple auto notes will be added. Manual notes can also be added to reference information found in the image or face. All manual notes will be added to any reports, where the image is used.

Figure 17:
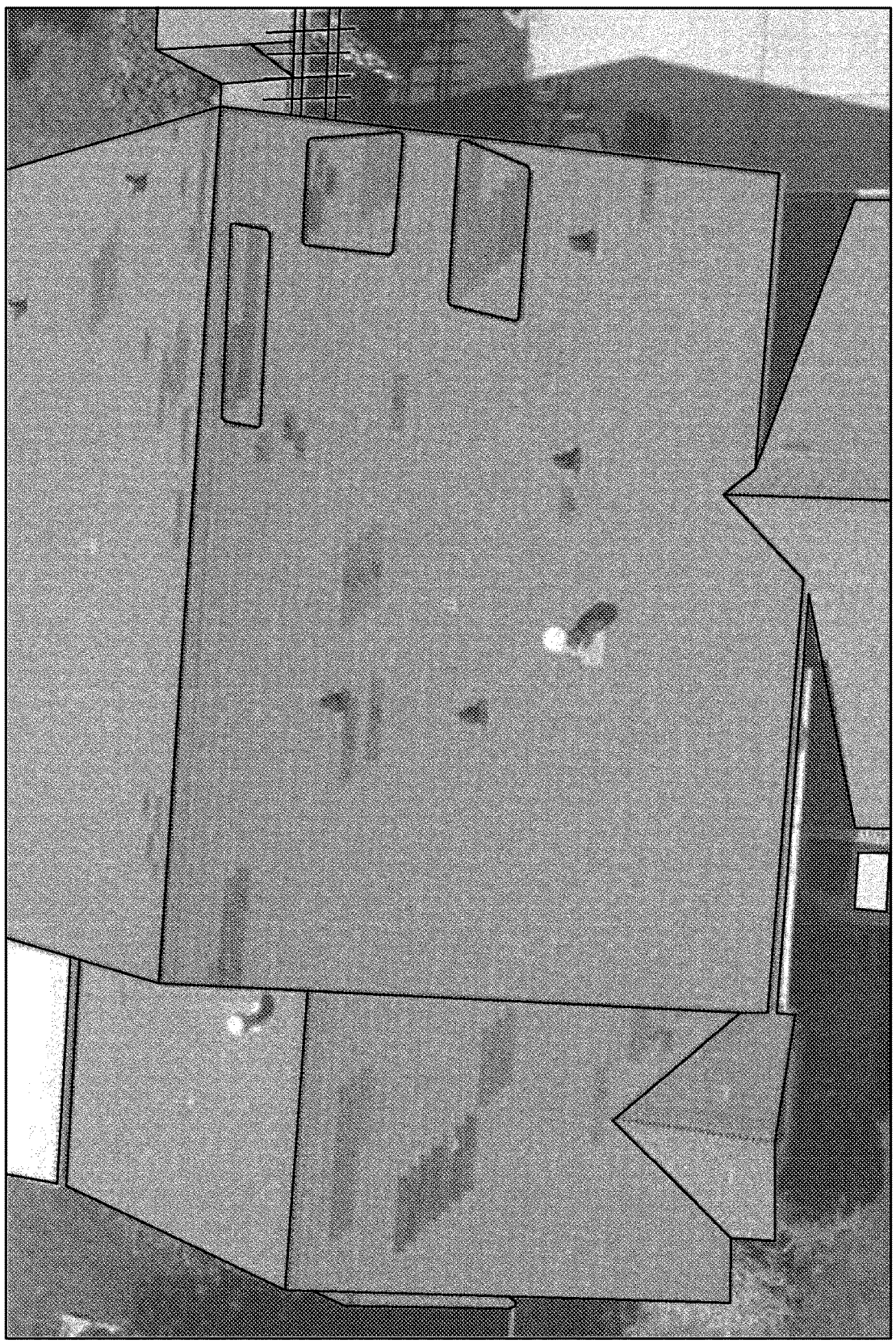
FIGS. 17 and 18 are diagrams illustrating marking by the system of damage areas of the roof.
Figure 18:
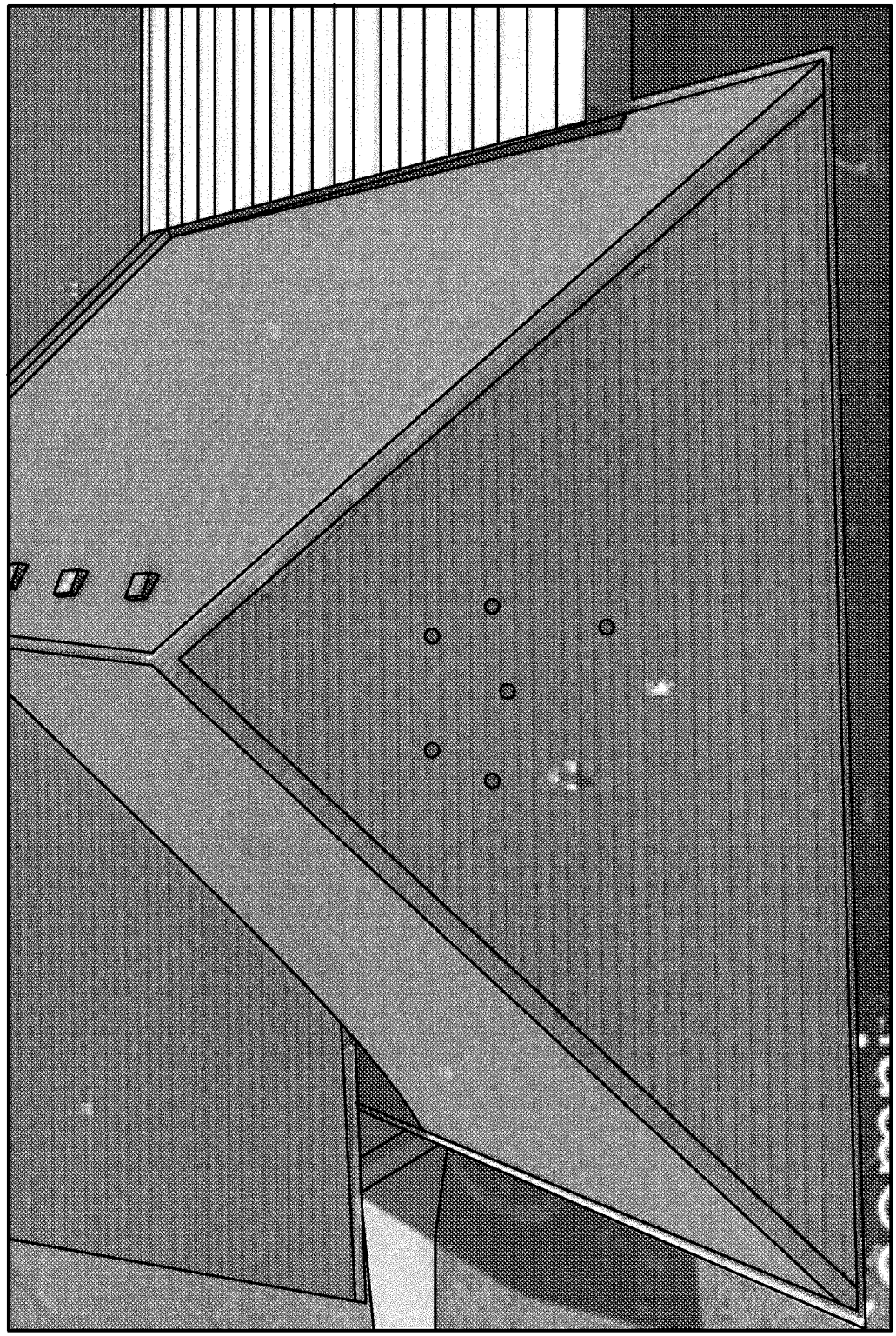

The system has various tools for annotating the damage, including for the reference points and the reference areas. The annotations can be specific to the type of damage or can be generic. In a first example, reference point annotations can be used in the case of hail or wind damage being visible in an image. Placing the annotations would reference the presence of a damaged shingle on a roof face or inside a test square. FIGS. 17 and 18 are illustration showing marked damage areas on the roof.

Figure 19:
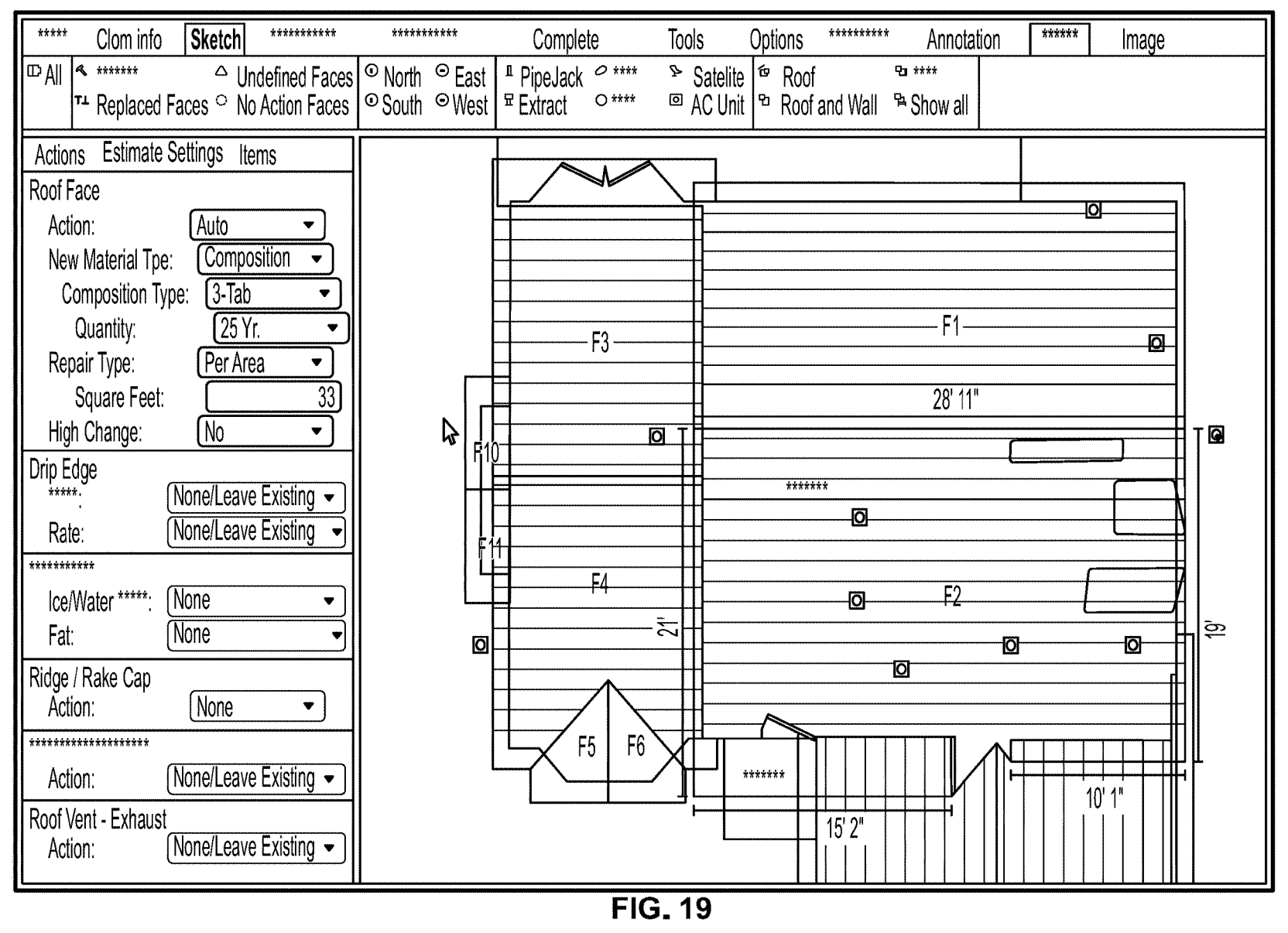
Figure 20:
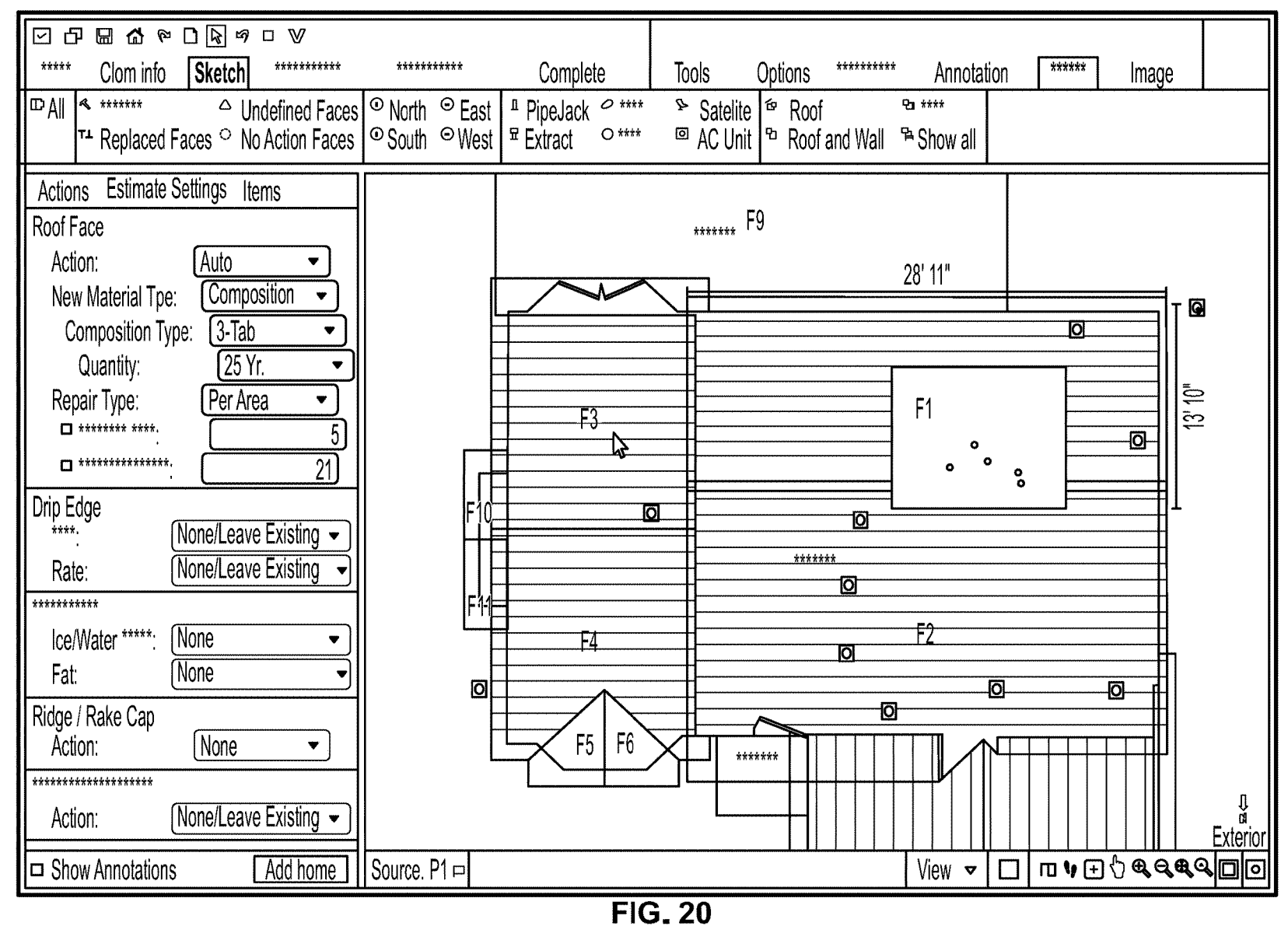
Figure 21:
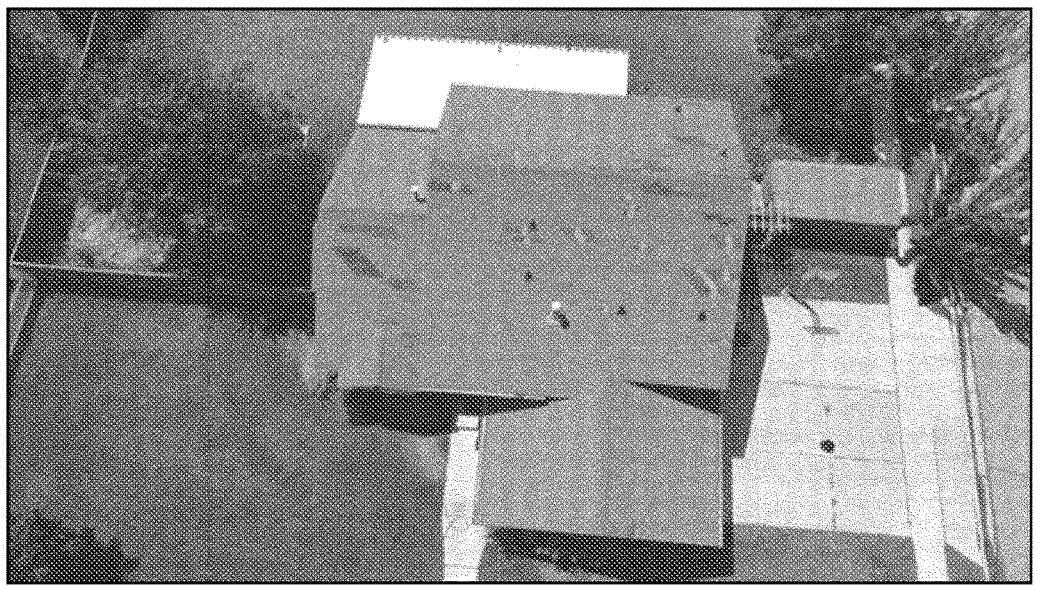

In a second example, reference point areas can be used to reference a large connected area of damage caused by, for example, wind. The area annotation are to be placed as a polygon to outline the damage. The system or the user can then calculate the total area needing repairs or replacement. As illustrated in FIGS. 19-21, the annotations can be used as input to scoping tools and to generate reports.

Figure 22:
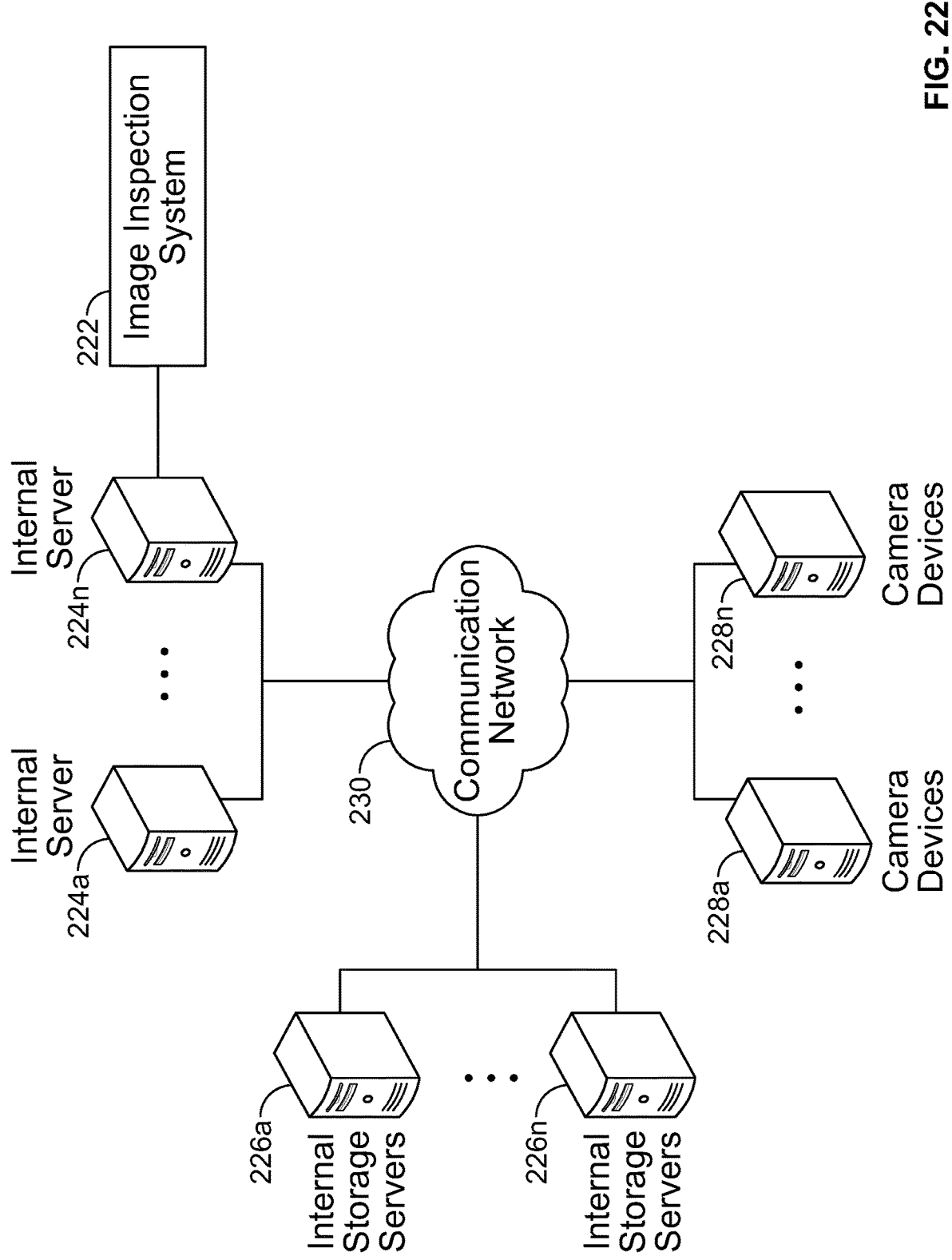
FIG. 22 is a diagram illustrating sample hardware components on which the system of the present disclosure could be implemented.

FIG. 22 is a diagram illustrating computer hardware and network components on which the system of the present disclosure could be implemented. The system can include a plurality of internal servers 224a-224n having at least one processor and memory for executing the computer instructions and methods described above (which could be embodied as computer software 222 illustrated in the diagram). The system can also include a plurality of image storage servers 226a-226n for receiving the image data and video data. The system can also include a plurality of camera devices 228a-228n for capturing image data and video data. These systems can communicate over a communication network 230. The image inspection system 222 or engine can be stored on the internal servers 224a-224n or on an external server(s). Of course, the system of the present disclosure need not be implemented on multiple devices, and indeed, the system could be implemented on a single computer system (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the appended claims.

What is claimed is:

1. A system for generating models from digital images in an interactive environment, comprising:
    a memory; and
    a processor in communication with the memory, the processor:
    capturing or deriving metadata for one or more digital images;
    deriving transforms from the metadata to align the digital images with one or more three-dimensional ("3D") models of objects/structures represented in the digital images;
    generating an interactive environment which allows a user to view a contextual model of each of the objects/structures in two dimensional ("2D") and 3D views; and
    generating and displaying to a user a list of images for each model surface of the contextual model, each image of the list of images projectable onto the contextual model and depicting the surface in a frame of the image.

2. The system of claim 1, wherein the metadata comprises camera intrinsic values and extrinsic values.

3. The system of claim 1, wherein the metadata comprises at least one of data relating to a global coordinate system, Global Positioning System data, a timestamp, or elevation data.

4. The system of claim 1, wherein the interactive environment comprises at least one of a workspace, a surface list, an image list or image notes.

5. The system of claim 1, wherein the interactive environment allows the user to generate annotations.

6. A method for generating models from digital images in an interactive environment, comprising the steps of:
    capturing or deriving metadata for one or more digital images;
    deriving transforms from the metadata to align the digital images with one or more three-dimensional ("3D") models of objects/structures represented in the digital images;
    generating an interactive environment which allows a user to view a contextual model of each of the objects/structures in two dimensional ("2D") and 3D views; and
    generating and displaying to a user a list of images for each model surface of the contextual model, each image of the list of images projectable onto the contextual model and depicting the surface in a frame of the image.

7. The method of claim 6, wherein the metadata comprises camera intrinsic values and extrinsic values.

8. The method of claim 6, wherein the metadata comprises at least one of data relating to a global coordinate system, Global Positioning System data, a timestamp, or elevation data.

9. The method of claim 6, wherein the interactive environment comprises at least one of a workspace, a surface list, an image list or image notes.

10. The method of claim 6, wherein the interactive environment allows the user to generate annotations.

* * * * *